Figure 6:
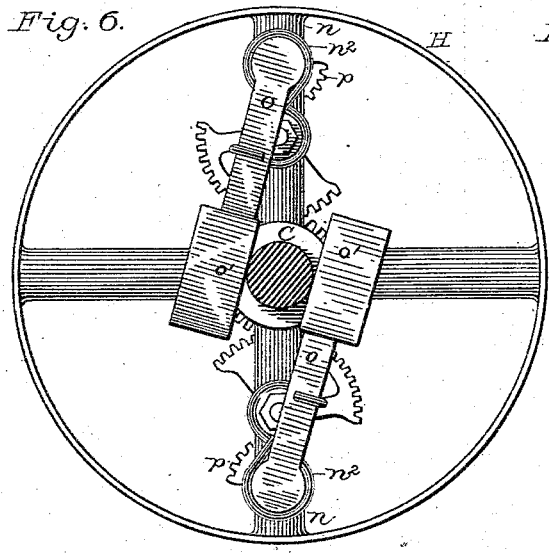

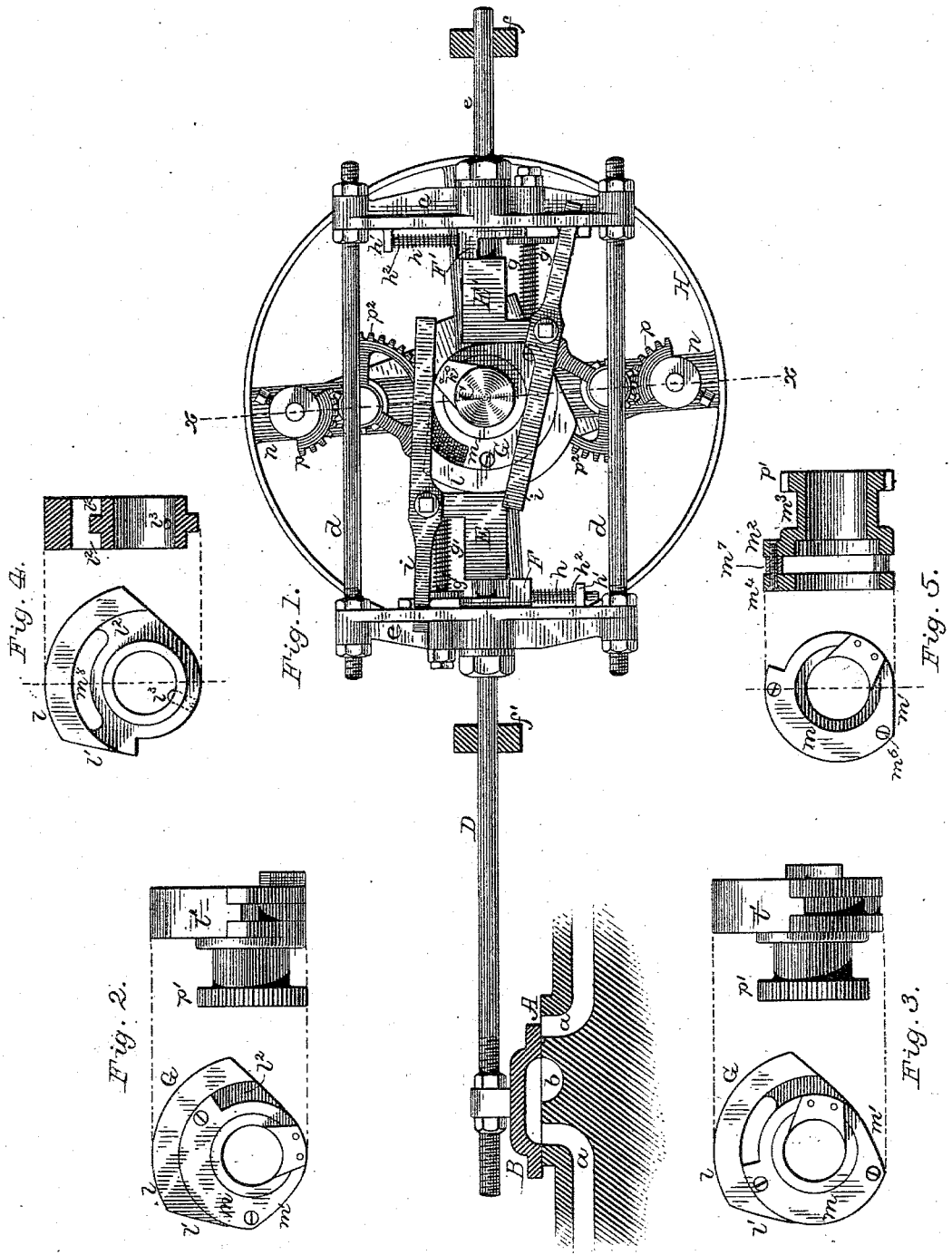

(No Model.) 2 Sheets—Sheet 2.

J. D. OLDS.
VALVE GEAR.

No. 281,123. Patented July 10, 1883.

Attest:
Philip F. Larner
Howell Beetle

Inventor:
John D. Olds
By Wm C Wood
Attorney

UNITED STATES PATENT OFFICE.

JOHN D. OLDS, OF FORT WAYNE, INDIANA.

VALVE-GEAR.

SPECIFICATION forming part of Letters Patent No. 281,123, dated July 10, 1883.

Application filed November 27, 1882. (No model.)

*To all whom it may concern:*

Be it known that I, JOHN D. OLDS, of Fort Wayne, in the county of Allen and State of Indiana, have invented certain new and useful Improvements in Steam-Engine Valve-Gears; and I do hereby declare that the following specification, taken in connection with the drawings furnished and forming a part of the same, is a clear, true, and complete description of the several features of my invention.

The prime object of my said improvements is to control and operate a single slide-valve upon the variable automatic cut-off principle, and to thereby attain in the use of such valves substantially those economic advantages which are incident to the use of automatic variable cut-off valve-gear of the most approved construction in connection with other varieties of valves, including the well-known cut-off slide-valves.

I am aware that it has heretofore been proposed to accomplish said end by means of valve-gear heretofore devised, and in some cases patented; but, so far as my knowledge extends, such prior apparatus has involved the use with said single slide-valve of double eccentrics, link-motions, or separate cams oppositely rotated; but I accomplish said result with one valve-actuating cam, which rotates and embodies two working-faces, and during the working of the engine one of said faces imparts to the valve its initial movement in both directions, followed by a rest of variable length, and the other working-face imparts to said valve its terminal movement, followed by a non-variable rest, and meantime steam enters and exhausts from the cylinder substantially as with any ordinary slide-valve. The working-face of my valve-cam, which imparts the terminal movement to the valve, I term the "fixed face," because its action upon the valve is never varied, and the cam-face, which causes the initial movement of the valve, I term the "variable face," because it can be varied in its position with reference to the fixed face, and thereby caused to vary the time of the initial movement of the valve, or, in other words, to vary the cut-off or closure of the ports when serving as induction-ports. The variable face of the cam may be moved and set by hand while the engine is at rest, or it may be placed directly under the control of a governor of any suitable variety. I employ with said valve-cam a yoke connected with the valve-rod, a pair of sliding spring cam-blocks for contact with the valve-cam, and a pair of automatic abutment-blocks, which are controlled by springs and by levers actuated by a tripping-cam, which is connected to and moves with the variable face of the valve-cam, so that said valve-cam, although it rotates in working the valve-rod, reciprocates said rod in a manner similar to the movements of induction-valve rods when actuated by vibrating and tripping toe-cams, as in certain well-known classes of marine engines. The cam-blocks, the abutment-blocks, their tripping-levers and tripping-cam constitute locking and tripping mechanism for enabling the valve-rod to be properly moved by the cam when the latter is in contact with the proper cam-block, and said mechanism also enables the other cam-block not then in use to bear against the opposite side of the cam without offering any resistance to the free movement of said cam, because these abutment-blocks alternately render the spring cam-blocks incapable of movement independently of the valve-rod during the contact therewith of the working-faces of the cam, and they also alternately permit said cam-blocks to remain stationary while in contact with the resting-face of the cam and during a portion of the initial movements of the valve-rod in both directions.

While the prime object of my invention is to operate with a variable cut-off a slide-valve which controls both the induction and eduction of steam, it is to be understood that as my improvements have special reference to the variable induction of steam they may be profitably employed with a slide-valve which solely controls induction and is accompanied by a second valve for exhaust, in which case this latter could be operated as usual by an eccentric.

Many different kinds of well-known governing mechanism may be employed in connection with certain features of my invention, because all that is requisite is to impart to the variable cam-face an advancing or retiring movement in the arc of a circle; but I have devised a governor embodying, in combination with weighted arms, a system of segmental geared levers which are geared to a pinion connected with the movable face of the valve-cam. In its best embodiment I mount my valve-cam upon the crank-shaft of the engine, the fixed face thereof being fixedly connected to and rotating with said shaft; but although the variable face is also rotatively mounted on said shaft and rotates with it, it is also capable of independent rotation thereon in both directions. The valve-cam may, however, be mounted upon an independent shaft, provided it be rotated in exact time with the crank-shaft, and said shaft may be located closely adjacent to the cylinder, if desired, and rotatively connected with the crank-shaft by suitable shafting and gearing. Wherever the valve-cam may be mounted, the governing mechanism may be mounted on the cam-shaft, as is preferred by me; or said mechanism may be otherwise mounted and operatively connected therewith without departure from certain features of my invention.

To more particularly set forth my said improvements, I will refer to the accompanying drawings, and, after a full description of the apparatus therein illustrated, the features deemed novel will be specified in the several claims hereunto annexed.

Figure 7:
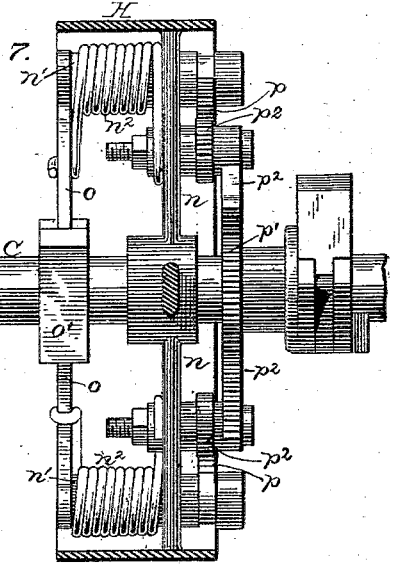
Figure 8:
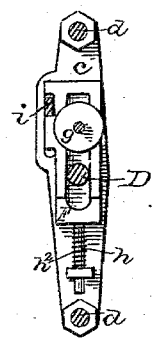
Figure 9:
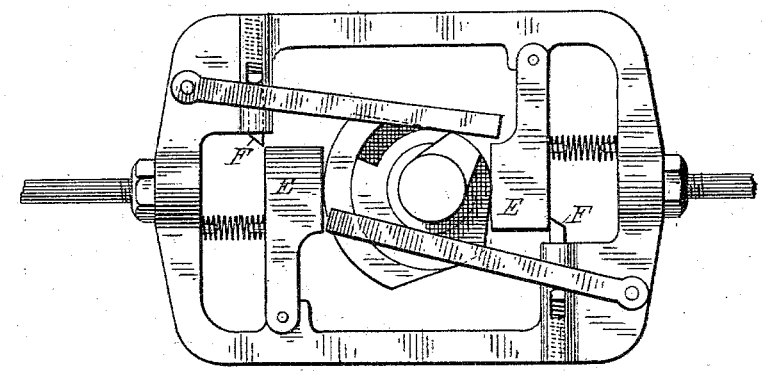

Figure 1 is a view of a steam-engine crank-shaft with my valve-gear attached thereto, and with a single slide-valve illustratively connected therewith. Fig. 2 is a front and side view of the valve-cam detached, and with its variable working-face in its normal position and in its closest proximity to the fixed working-face. Fig. 3 is a front and side view of said valve-cam with its variable face advanced beyond the fixed face as far as possible in a cam proportioned like the one thus shown. Figs. 4 and 5 are detached views of the main parts of said cam, on which are respectively the fixed face and the variable face. Fig. 6 is a side view of the governing mechanism. Fig. 7 is a sectional view of said mechanism on line $y$, Fig. 6. Fig. 8 is a vertical section of Fig. 1 on line $x$. Fig. 9 is a side view illustrating locking and tripping mechanism, wherein the cam-block swings on a pivot and a latch serves as an abutment-block.

As illustrated by me, no provision has been made for compensating for the wear of my cam; but it is obvious that this can be effected by employing between the sliding rod, which is moved by the cam, and the valve-rod a pendent lever with adjustable connections.

I have not deemed it necessary to illustrate a complete engine, but have shown in longitudinal section a valve-seat, A, having a pair of ports, $a$, for induction and eduction, and an intermediate exhaust-passage, $b$, surmounted by a simple slide-valve, B, all of which are substantially as with such ordinary single slide-valves as control the induction of steam to and its exhaust from a steam-engine cylinder.

As here shown, my valve-gear is mounted upon the crank-shaft C, and the valve-rod D is therefore long enough to extend from the cylinder beyond the crank-shaft; but adjacent to said shaft it is complex in its construction, in that it is composed of two vertical cross-arms, $c$, and horizontal upper and lower rods or bolts, $d$, which connect said arms and form a yoke surrounding said shaft, and a tail-rod, $e$, serves as a prolongation of the valve-rod, (beyond the rear end of said yoke,) which slides in a guide-bearing, $f$, and a second guide, $f'$, is also preferably provided for the valve-rod in front of the yoke, to secure a true longitudinal movement of said yoke and rod. This yoke may be largely varied in its construction without affecting the results, it being only requisite to provide for properly inclosing the valve-cam, and for so mounting said yoke and connecting it with the valve that the movements of the yoke will be in a right line, and impart to the valve exactly corresponding movements. The valve-rod and the tail-piece $e$ pass through their respective arms $c$, and serve as slide-bearings for the L-shaped cam-blocks E E', each of which has a guiding-spindle, $g$, sliding through a bearing provided therefor in the adjacent arm $c$. Each of said spindles is inclosed by an expansive spiral spring, $g'$, which abuts at one end against the adjacent inner face of an arm, $c$, and at its other end it abuts against the coincident portion of the cam-block, so that both of said cam-blocks are normally forced inwardly or toward each other, and they are free to be moved outwardly against their springs, except when prevented from such movement by the abutment-blocks F F', which are fitted to vertical slides, and move parallel with the inner faces of the arms $c$. Each abutment-block has a spindle, $h$, which, at its outer end, passes through a guide, $h'$, projecting from the adjacent arm $c$. An expansive spiral spring, $h^2$, incloses said spindle $h$ and abuts with its ends respectively against the guide $h'$ and the abutment-block, so that both of the latter are normally forced inwardly or toward their respective cam-blocks E or E', so as to pass between the rear ends thereof and the inner surfaces of the arms $c$, thereby locking said blocks against all movement independently of the valve-rod. Each abutment-block is automatically caused to retire from its normal position by means of a lever, $i$, which has its fulcrum upon one side of its adjacent cam-block, and the free ends of both of said levers $i$ extend beyond the crank-shaft, one being above it, the other below it, and both of said levers are alternately vibrated by a tripping-cam, $k$, which moves or rotates with the valve-cam G in such a manner that the abutment-blocks are alternately tripped or forced against their springs, and are thereby caused to retire from the rear of the cam-blocks, thus permitting the latter to alternately rest or remain stationary during the movement of the yoke; and, on the other hand, when said abutment-blocks are in their normal position at the rear of said cam-blocks, the latter are moved by the valve-cam and carry with them the yoke and valve-rod whenever the working-faces of the valve-cam G engage with the coincident ends of said cam-blocks, as will be hereinafter further described. The abutment-blocks and their levers and their tripping-cam constitute a locking and tripping mechanism for alternately placing the cam into and out of its operative connection with the valve-rod.

While I have reason to prefer the locking and tripping mechanism shown, I desire it to be distinctly understood that said mechanism may be largely varied, so as to be very dissimilar in its appearance from that shown without materially affecting the results sought, and without departure from certain features of my invention; and it will be readily suggested to persons skilled in such matters that tripping and locking mechanism more closely resembling that employed with the valves of marine engines can be successfully employed in lieu of the sliding cam-blocks, abutment-blocks, and levers shown, for placing the valve-rod into operative connection with the working-faces of the valve-cam, twice in each revolution thereof, and preventing lost motion, at the moment of the initial action of said cam, in moving the valve-rod in either direction; and I have illustrated in the drawings another arrangement of locking and tripping mechanism, which will be hereinafter particularly described.

The valve-cam G is composed of the fixed face-section $l$ and the variable face-section $m$, and both are united, so as to constitute one complex cam. The fixed section $l$ (shown detached in Fig. 4) is, at its periphery, the segment of a little more than a quarter of a circle, and it has its working-face at $l'$. On each of its sides this section $l$ is annularly recessed, as at $l^2$, thus forming a thin shank or hub, which is provided with a radial set-screw, $l^3$, for securing it to the shaft C. The variable face-section $m$ is composed of two parts, and has its working-face at $m'$. The part $m^2$ of this section $m$ has a hub, $m^3$, loosely mounted on the shaft C at the one side of the fixed cam-section $l$, and the part $m^4$ of said section $m$ is located on the opposite side of said fixed section $l$. These two parts $m^2$ and $m^4$ are firmly connected by a transverse bolt, $m^6$, adjacent to the working-face $m'$, and also by a bolt, $m^7$, which passes through a curved slot, $m^8$, in the fixed section $l$.

The variable section $m$ is shown detached in Fig. 5, and it will be seen that in form it corresponds generally with the fixed section $l$, in that at its periphery it is a segment of about the same length as the fixed section, but of a smaller circle; and it will also be seen that when the several parts of the valve-cam are connected the periphery of the variable section next adjacent to its working-face $m'$ merges with the working-face $l'$ of the fixed section $l$, and the periphery of said variable section either serves as a slight prolongation of the fixed working-face $l'$ or as a rest between said fixed working-face and the variable working-face $m'$, said rest varying according to the extent to which the variable face may be from time to time rotatively advanced from said fixed working-face.

It will be seen that at all times some portions of the valve-cam are in contact with the coincident faces of the cam-blocks, and that when the working-faces $l'$ and $m'$ are in contact with either cam-block its respective abutment-block is interposed between said cam-block and the adjacent yoke-arm $c$, so that the valve-cam, acting against the cam-block, imparts to the valve-rod its proper longitudinal movement; and it will also be seen when either cam-block is thus being moved with the valve-rod by the cam that the other cam-block, being inactive, remains stationary, its abutment-block having meantime been retired from its position at the rear of said block, and that as soon as the periphery of the cam passes beyond said inactive cam-block the spring of the latter forces it inwardly, opening the space at the rear of said block for the reception of its abutment-block, whereupon said block is in readiness for the working-faces of the cam to act thereon for moving the valve-rod in the opposite direction.

I have already stated that said abutment-blocks are actuated in one direction and into their locking position by springs, and in the opposite or tripping direction by levers $i$, which are vibrated by the tripping-cam $k$, and it is now to be understood that said tripping-cam $k$ is connected to the variable section $m$ of the valve-cam G, and projects from the side of the hub $m^5$ of the part $m^4$ of said variable section, so that as said tripping-cam occupies a fixed position with relation to the variable working-face $m'$ and is movable therewith it actuates the lever of each abutment-block for releasing or tripping its respective cam-block just preceding the contact of the variable face of the valve-cam with the face of the opposite cam-block.

As thus far described, it will be understood that when the variable working-face occupies a position as near as is possible to the fixed working-face of the cam said cam, as a whole, has a proper contour for so working the slide-valve as to leave each steam-port more or less open for induction during a little more than, say, one-half of the stroke of the piston.

It is also to be understood that when the engine is on its center the fixed working-face of the cam is in contact with, for instance, the cam-block E, and that when the engine barely passes its center said working-face moves the valve-rod so as to uncover the proper port for induction, and to fully open said port at about one-sixteenth of the stroke of the piston, and to hold it thus fully opened during about a half-stroke of the piston, the said working-face meantime rotating until brought into contact with the cam-block E', whereupon, with a fractional movement of the piston, the valve quickly closes that port and cuts off the live steam, the exhaust of steam being meantime substantially as with other slide-valves. The cam with its two working-faces, whether one be variable or both are fixed, or, in other words, whether said cam be complex, as described, or a solid cam of similar contour, in combination with the cam-blocks and abutment-blocks, or with equivalent locking and tripping mechanism, are deemed by me preferable to any prior arrangement of cams or eccentrics known to me for operating a slide-valve, and said two-faced cam, in the combination named, constitutes one feature of my invention, regardless of the variable feature.

I will now describe the effect of throwing the variable face forward. When said variable face is in its normal position, I have stated that it commences to close the port last opened for induction just after a half-stroke of the piston; but when said variable face is advanced to its position farthest from the fixed face the valve is fully opened at, say, one thirty-second of a stroke, and it then commences to close said port, and fully closes it at about three thirty-seconds of the stroke, and it is obvious that any intermediate adjustment can readily be made, so as to cut off the steam at any practicable fraction of the stroke, and it is equally obvious that the steam may be cut off at a smaller fraction of the stroke, if desired, by so constructing the valve-cam that its variable face can be farther advanced from its fixed face than when the parts are proportioned as shown in the drawings. The arrangement of the two sections of the valve-cam, as shown, enables the location of the two working-faces in the same vertical plane, so that both can operate upon a comparatively narrow cam-block; but it is obvious that said sections may be mounted side by side, and that the aggregate width of their faces need be no greater than the width of a cam having its sections arranged as shown.

The variable working-face, being rotative independently of the shaft C, may be set in any desired position by hand and secured by bolts or pins, and thus enable the steam to be cut off at any desired portion of the stroke less than that at which it would normally operate—as, for instance, the shaft C could be provided with a segmental flange or plate secured thereto, and provided with bolt-holes arranged in the arc of a circle near its outer end, and the hub of the variable cam-section provided with a radial arm or finger, also bored to receive a bolt passed by hand through said segmental plate for locking said hub to said plate; and therefore the combination of the cam having a variable face, and the cam-blocks with abutment-blocks and levers, or equivalent locking and tripping mechanism, constitutes another feature of my invention, however said variable face may be controlled or adjusted.

In Fig. 9 I show a pivoted cam-block, E, and an abutting-latch, F, serving, respectively, in lieu of the sliding cam-block and the abutment-block previously described, and in this case the latch and block are actuated in one direction by springs, and the latch is released or tripped from the cam-block by means of a lever and a tripping-cam, as before described.

I have devised certain automatic governing mechanism, whereby the variable face of the valve-cam is advanced or retired, according to the speed of the engine; but it is to be understood that other well-known types of governors may be employed without departure from certain features of my invention, it being obvious that any governor, which, with suitable connecting mechanism, can cause the rotation of the variable portion of the valve-cam independently of the shaft on which it is mounted can be employed with substantially similar results, although I prefer that class of ball or weighted governors which rotate upon or around horizontal axes, as distinguished from such as rotate on or around vertical axes, and the governor which I have specially devised belongs to said preferred class.

My improved governing mechanism embodies the usual wheel, H, mounted upon and rotating with a horizontal shaft, which is usually the crank-shaft C. Upon two of the oppositely-located radial arms $n$ of said wheel there is pivoted, near the outer end thereof, a lever, $o$, pointing inwardly across the shaft, and having a weight, $o'$, mounted so that it can be moved to and fro longitudinally thereon, and be firmly secured in any desired position. Each weighted arm or lever has a pivot-shaft, $n'$, surrounded by a torsional spiral spring, $n^2$, so set as to normally force the weighted end of the lever toward and against the shaft C. At its end each pivot-shaft $n'$ has a segmental toothed lever, $p$, which is geared to the toothed pinion $p'$ (on or forming a part of the hub $m^3$ of the variable section of the valve-cam) by means of an intermediate segmental toothed lever, $p^2$, mounted on a fulcrum-stud, which projects from the radial wheeled arm on which the weighted lever is pivoted; and it will readily be seen that as the weights are moved outwardly by varying centrifugal force, and inwardly by the pivot-springs $n^2$, the hub will be rotated independently of the shaft C, and the variable face of the cam will be advanced from or retired toward the fixed face of said cam, and result in the desired variable action of the slide-valve in cutting off the steam.

Having thus described my invention, I claim as new and desire to secure by Letters Patent—

1. The combination, substantially as hereinbefore described, of a slide-valve, the rotating cam having two working-faces, and locking and tripping mechanism for enabling said cam to move the valve in either direction with an intermitting movement, and to cause a rest after the terminal movement of the valve in each direction, as set forth.

2. The combination, substantially as hereinbefore described, of a slide-valve, the rotating valve-cam having a fixed and a variable face, and the locking and tripping mechanism.

3. The combination, substantially as hereinbefore described, of a slide-valve, the rotating valve-cam having a fixed and a variable working-face, the locking and tripping mechanism, and the governing mechanism for automatically varying the position of the variable face with relation to the fixed face.

4. The combination, substantially as hereinbefore described, of a slide-valve, its rod and yoke, the rotating valve-cam having two working-faces, the sliding cam-blocks, the abutment-blocks, the levers, and the cam which alternately vibrates the abutment-blocks for alternately tripping the cam-blocks, as set forth.

5. The combination, substantially as hereinbefore described, of a slide-valve, the rotating valve-cam having the variable and fixed working-faces, and the locking and tripping mechanism controlled by a cam which moves with the valve-cam, but is variable with relation to the fixed face thereof, and is advanced or retired with said variable face, as set forth.

6. The combination, substantially as hereinbefore described, of a slide-valve, the rotating valve-cam having the variable and the fixed working-faces, the locking and tripping mechanism, and a governor mounted upon the valve-cam shaft and connected with the variable face of said cam.

7. The combination, with the rotating valve-cam having the fixed and the variable working-faces, of the weighted arms and segmental toothed levers geared to the variable working-face of said cam, substantially as described.

JOHN D. OLDS.

Witnesses:
 FERD. F. BOLTZ,
 JOS. HENRY WILDER.